Figure 1:
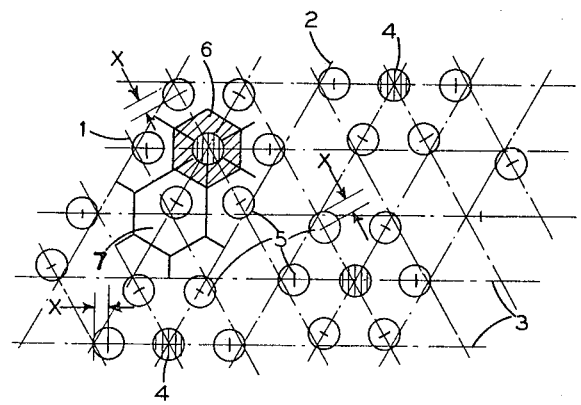

INVENTOR.
Arno Müller 3,267,003
NUCLEAR REACTOR
Arno Müller, Oberhausen, Rhineland, Germany, assignor to Babcock & Wilcox, Limited, London, England, a company of Great Britain
Filed Sept. 19, 1962, Ser. No. 224,799
Claims priority, application Germany, Sept. 27, 1961, D 37,130
2 Claims. (Cl. 176—41)

The present invention is directed to a heterogeneous nuclear reactor controlled by movable control rods in which the control rods and fuel elements are arranged as a core and are disposed in a substantially uniform lattice within the neutron moderator. According to the invention the lattice may either be rectangular or hexagonal with the fuel elements being displaced from the corresponding lattice points towards the associated control rods to a predetermined extent. As a result, the amount of moderation is maintained substantially uniform in the reactor core regardless of the positioning of the control rods.

In most heterogeneous reactors of the prior art the fuel elements are disposed in a uniform lattice within a neutron moderating body such as water or graphite. In addition, movable neutron absorption rods are disposed as control rods in the moderator body for regulating the neutron flux therein. It is known that these control rods may be either positioned at lattice points originally occupied by fuel elements or they may be placed at inter-lattice points. The positioning of the control rods at the inter-lattice points is more advantageous since the thermal neutron flux is less drastically effected in the core upon repositioning of the control rods than is the case where the control rods are positioned at the original lattice points. However, for reasons of stability and strength of the moderator material the control rods must be placed in channels originally occupied by fuel elements, i.e. within the fuel element lattice. As a result, upon the withdrawal of the control rod, account must be taken of the fact that the thermal neutron flux will increase in the adjacent fuel elements due to the moderator material associated with the control rod being moved. This increase in neutron flux has a very disturbing effect upon the chain reaction of the moderator, particularly in reactors which are undermoderated where the fuel elements may become overheated.

Accordingly, the present invention provides a heterogeneous nuclear reactor comprising a plurality of fissionable material-bearing fuel elements and a plurality of control rods arranged as a core capable of undergoing a self-sustaining fission type chain reaction, wherein the control rods and the fuel elements are arrayed in a substantially uniform lattice within the core with the control rods being disposed at the lattice points and the fuel elements being displaced from the lattice points toward an adjacent control rod to provide uniform neutron flux within the lattice upon withdrawal of the control rod.

Furthermore, the space around each control rod is divided into imaginary areas corresponding to the associated fuel elements wherein the area around the adjacent fuel elements and the portion around the control rod form a composite area with the fuel element being positioned at the centroid of each composite area.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:
FIG. 1 illustrates the application of the present invention to a core of a nuclear reactor having a hexagonal lattice; and
FIG. 2 illustrates the present invention as applied to a nuclear reactor core having a rectangular lattice.

The core of the nuclear reactor is schematically illustrated in FIG. 1 wherein axes 1, 2, and 3, respectively are shown. The control rods 4 are shown disposed at the lattice points, or intersections of the axes. Fuel elements 5 are shown disposed in the lattice but displaced from the lattice points toward the adjacent control rods by the amount designated by X. The amount of displacement X can be graphically defined by distributing the area of the moderator associated with a control rod among the various moderator areas associated with the adjacent fuel elements to create composite moderator areas. The fuel elements are then arranged at the center of gravity, or centroid, of the various composite areas. This is illustrated in FIG. 1 where the control rod moderator area 6 is shown sub-divided into sectors which are distributed among the associated fuel element moderator areas 7.

Figure 2:
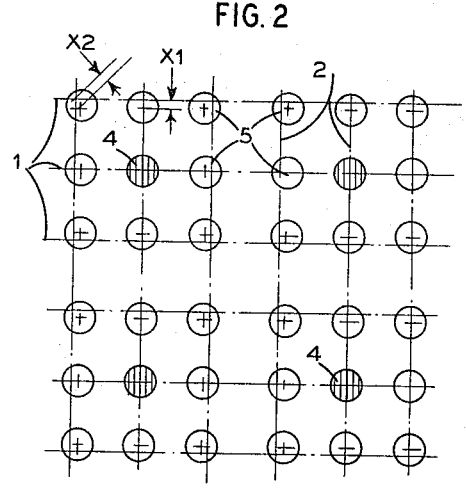

A nuclear reactor having a core arranged with a rectangular lattice is illustrated in FIG. 2 utilizing the same principles as set forth by FIG. 1. In this arrangement displacements $X_1$ and $X_2$ of the fuel elements 5 may vary, depending upon the relation of the fuel element involved with respect to the control rod. Thus, the fuel elements positioned at more remote positions from the control rods may remain at the lattic points so that $X_2$ would equal 0.

It is to be understood that the present invention may be applicable to reactors utilizing either solid or fluid moderators. In the case of solid moderator reactors it would be desirable to shape and assemble the moderator blocks according to the predetermined lattice with the displacement of the fuel elements being provided by the eccentric arrangement of the fuel element channels therethrough.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:
1. A heterogeneous nuclear reactor comprising a plurality of fissionable material-bearing fuel elements and a plurality of control rods arranged as a core capable of undergoing a self-sustaining fission-type chain reaction, said core having a substantially uniform lattice, said control rods being disposed at a portion of said lattice points of said core, said core being divided into uniform contiguous regular polygonal areas about each lattice point, the area about each lattice point containing a control rod being equally divided and complementing corresponding areas about the immediately adjacent lattice points to form composite areas, said fuel elements immediately adjacent said control rods being disposed at the centroid of each of said composite areas to provide substantially uniform neutron flux within said lattice.

2. A heterogeneous nuclear reactor comprising a moderator having a uniform space-lattice formed therein, a plurality of fissionable material-bearing fuel elements and a plurality of control rods arranged as a core in said moderator capable of undergoing a self-sustaining fission-type chain reaction, said control rods being disposed at a portion of said lattice points in said moderator, said moderator being divided into uniform contiguous regular polygonal areas about each lattice point, the area about each lattice point containing a control rod being equally divided and complementing corresponding areas about the immediately adjacent lattice points to form a plurality of composite areas, said fuel elements immediately adjacent said control rods being disposed at the centroid of each composite area to provide substantially uniform neutron flux within said core.

References Cited by the Examiner
UNITED STATES PATENTS

| | | | |
|---|---|---|---|
| 2,837,475 | 6/1958 | Newson | 176—41 X |
| 2,999,059 | 9/1961 | Treshow | 176—42 |

OTHER REFERENCES

Proceedings of the Second U.N. International Conference on the Peaceful Uses of Atomic Energy, 1958, vol. 10, pp. 238–250, 464–472.

REUBEN EPSTEIN, *Primary Examiner.*

CARL D. QUARFORTH, *Examiner.*

P. G. BETHERS, *Assistant Examiner.*